US006438232B1

(12) United States Patent
Mages et al.

(10) Patent No.: US 6,438,232 B1
(45) Date of Patent: Aug. 20, 2002

(54) METHOD OF SECURING THE PLAYBACK OF A DVD-ROM VIA TRIGGERING DATA SENT VIA A CABLE NETWORK

(75) Inventors: Kenneth G. Mages, Highland Park; Jie Feng, Evanston, both of IL (US)

(73) Assignee: John Ga 1t Media, Inc., New York, NY (US)

( * ) Notice: Subject to any disclaimer, the term of this patent is extended or adjusted under 35 U.S.C. 154(b) by 0 days.

(21) Appl. No.: 08/911,796

(22) Filed: Jul. 14, 2000

(51) Int. Cl.[7] .................................................. H04L 9/00
(52) U.S. Cl. ....................................................... 380/203
(58) Field of Search ............................... 380/200–203, 380/277

(56) References Cited

U.S. PATENT DOCUMENTS

| | | |
|---|---|---|
| 4,930,158 A | 5/1990 | Vogel |
| 5,319,705 A | 6/1994 | Halter et al. |
| 5,457,746 A | 10/1995 | Dolphin |
| 5,555,303 A | 9/1996 | Stambler |
| 5,576,843 A | 11/1996 | Cookson et al. |
| 5,596,639 A * | 1/1997 | Kikinis ........................ 380/277 |
| 6,035,329 A * | 3/2000 | Mages et al. ................ 709/217 |
| 6,185,306 B1 * | 2/2001 | Mages et al. ................ 380/203 |

FOREIGN PATENT DOCUMENTS

| | | |
|---|---|---|
| EP | 0665486 | 8/1995 |
| EP | 0673034 | 9/1995 |
| EP | 0715247 | 6/1996 |
| EP | 0717338 | 6/1996 |
| JP | 34334 | 10/1996 |

* cited by examiner

Primary Examiner—Salvatore Cangialosi

(57) ABSTRACT

A method and system for implementing the pay-per-view DVD-ROM system, whereby the enabling data provided to the DVD-player allowing the playback of the DVD-ROM video data is provided to the DVD-player via the Internet or via the cable-TV system provider. The invention discriminates between DVD-ROM's requiring pay-per-view play, and those that are free and do not require pay-per-view play, by the use of a special code for the header of the DVD-ROM indicating a pay-per-view title.

23 Claims, 1 Drawing Sheet

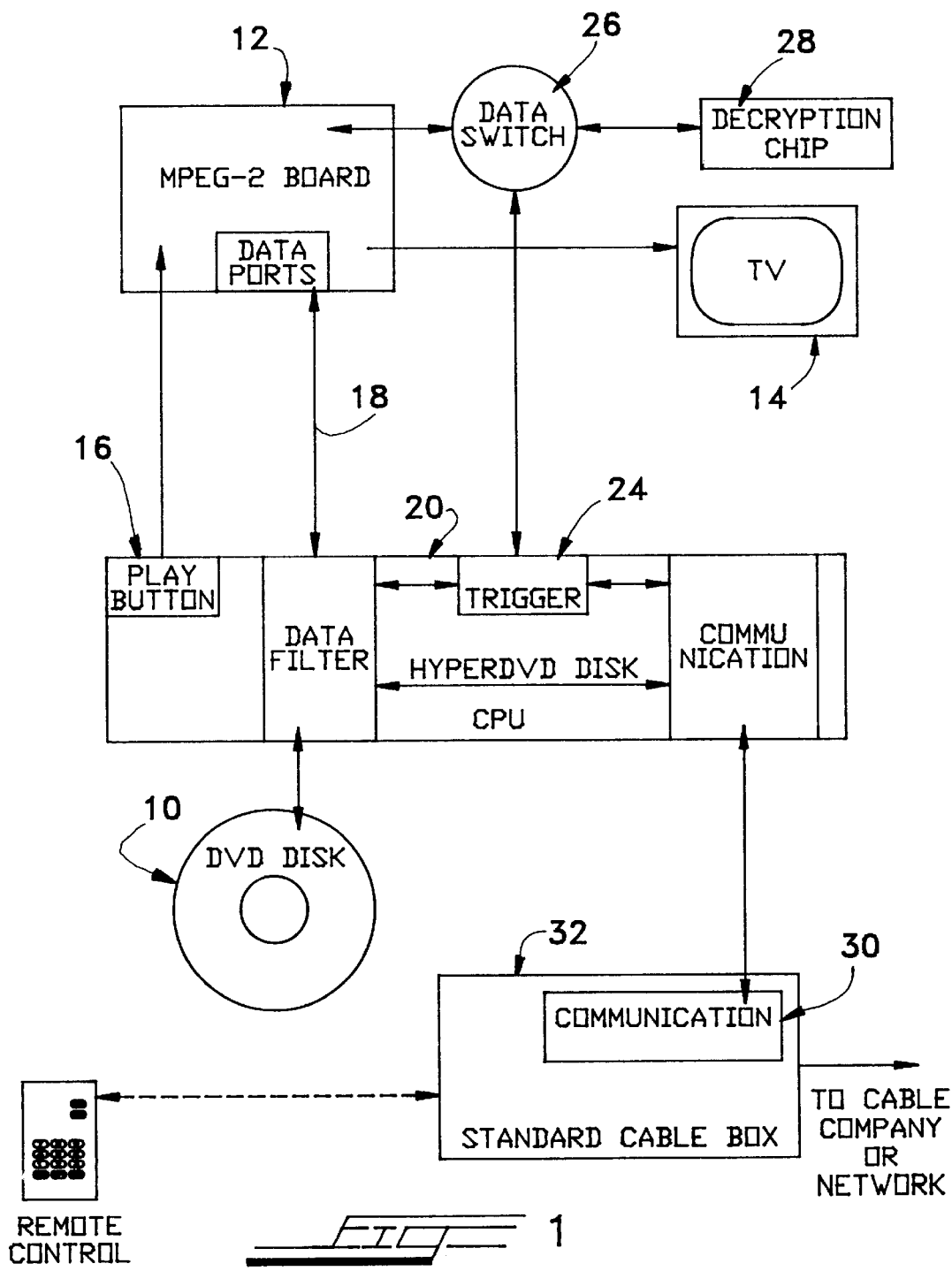

METHOD OF SECURING THE PLAYBACK OF A DVD-ROM VIA TRIGGERING DATA SENT VIA A CABLE NETWORK

CROSS REFERENCE TO RELATED APPLICATION

The present application is a continuation-in-part of application Ser. No. 08/872,082 filed on Jun. 10, 1997, now U.S. Pat. No. 6,185,306 which is a continuation-in-part of application Ser. No. 08/568,631, filed on Dec. 7, 1995, now abandoned and a continuation-in-part of application Ser. No. 08/756,162, filed on Nov. 25, 1996 now U.S. Pat. No. 5,892,825.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

In Applicants' copending applications listed above, which are incorporated by reference herein, there is a disclosed a method of securing a CD-ROM by crippling the video and audio data thereon, and allowing the playback of the data thereon only by means of enabling data sent via the Internet, which enabling data uncripples the crippled data on the CD-ROM.

While CD-ROMs provide a great amount of data storage, a new disc called DVD-ROM (digital video disk) provides considerably more data storage, reaching data storage capacities of up to 17 GB as compared to 680 MGB for a CD-ROM. This DVD-disc has especial usefulness in the storage of archiving data and in the storage of video data, such as full-length movies. Conventional CD-ROMS do not provide enough storage capacity for full-length movies, and the like. In conjunction with the DVD-ROM disc, is a new envisioned technology called "Zoom-TV", which will prevent the playback of the DVD-ROM without first obtaining permission form a service-provider. This service-provider will send the necessary enabling data to the system playing the DVD-ROM for allowing the data on the DVD-ROM to be played back, for which the user of the DVD-ROM will be billed, whereby a pay-per-view type of system is effected. The user's system for playing the DVD-ROM will call the service-provider via the land-line telephone network, over which the necessary enabling data for playing the DVD-ROM is also transmitted to the user's or requesting system. The pay-per-view DVD system will typically include a DVD-player, which includes a video player such as MPEG-2, a TV or monitor, and a microprocessor or personal computer. The user will request permission to playback the video on the DVD-ROM by calling up the service provider via the public, switched telephone network, or PSTN.

DVD-ROMs containing full-length movies presently are provided with parental rating controls, which a three-tier format: To wit, a "Kids' Title" playback only, a "Forbid Adult Titles" mode, and a "Play All Titles" mode. Each title of a DVD-ROM is accorded one of a first, general category allowing playback by any of the three modes, a second "Kids" category for playback only in the "Kids' Title" playback mode and which prevents all other titles including adult titles, and a third "Forbid-Adult" category for which only adult titles are prevented from being played but all other titles may be played. For purposes of this application, the first general category, allowing complete playback of all titles, is assigned the equivalent code of "1" in its heading, while the second Kids' titles only playback mode is assigned a code for "2", and the third "Forbid-Adult" category for which only adult titles are prevented from being played having a code of "3" in its header. The DVD player, such as MPEG-2, has corresponding software for detecting the category codes, and software for setting the level of playback, whether it be the first, second or third mode.

In addition to parental control codes, each DVD-ROM also has a country code, with the code representing the country of manufacture of the DVD-ROM. In conjunction with this, each DVD-player has a country code, with the DVD-player's software preventing play of the DVD-ROM if the country code on the DVD-ROM does not match the country code of the DVD-player. This system is intended to prevent the illegal copying and pirating of the videos on the DVD-ROM.

Cable-TV networks are well-known. These systems utilize a set-top box converter for receiving the signals from the cable-TV provider and playing them back on the TV or monitor. Cable-TV networks also now have units that allow access to the Internet via the cable network, with such units having their own microprocessor for allowing communication with the Internet and for the display of Internet data on the TV or monitor.

SUMMARY OF THE INVENTION

It is the primary objective of the present invention to provide a method and system for implementing the pay-per-view DVD-ROM system, whereby the enabling data provided to the DVD-player allowing the playback of the DVD-ROM (Hyper-DVD) video data is provided to the DVD-player via the Internet or via the cable-TV system provider.

It is also the primary objective of the present invention to provide a method and system for playing back DVD-ROMs which system discriminates between DVD-ROM's requiring pay-per-view play, and those that are free and do not require pay-per-view play.

It is also the primary objective of the present invention to provide a method and system for playing back DVD-ROMs which system discriminates between DVD-ROM's requiring pay-per-view play, and those that do not, by the use of a special code for the header of the DVD-ROM indicating a pay-per-view title.

BRIEF DESCRIPTION OF THE DRAWINGS

The invention will be more readily understood with reference to the accompanying drawing, wherein:

FIG. 1 is a block diagram of the DVD-ROM player system of the invention allowing both pay-per-view DVD-ROM play and conventional, non-pay-per-view DVD-ROM play.

DETAILED DESCRIPTION OF THE INVENTION

Referring now to the drawing in greater detail, a DVD-ROM disk 10 contains a full-length movie, play, special event, and the like. For playing the DVD-ROM, there is provided a DVD-ROM player 12, such as MPEG-2 for playing the video on a TV or monitor 14. Associated with the player is a microprocessor of CPU 16, such as that forming part of a PC, or a dedicated microprocessor. The microprocessor 16 conventionally communicates with the DVD-player 12 via data ports 18. Associated with the microprocessor is memory storage 20 for storing software that allows the system of the invention to discriminate between DVD-ROM's requiring pay-per-view play, and those that are free and do not require pay-per-view play. Specifically, when the DVD-ROM to be played is provided with one of the three parental codes, then the software of the invention will treat that DVD-ROM in the conventional manner, by allowing instant playing thereof. Referring to FIG. 1, this is seen by the software determining that a non-pay-per-view DVD-ROM is present, or non-Hyper-DVD disk, and will automatically provide a trigger-signal 24 to a data switch 26. The data switch, upon receiving the trigger-signal, will connect a conventional decryption chip 28 to the DVD-player 12, whereupon the data on the DVD-ROM is decrypted and played back, in the conventional manner.

If the software of the invention has determined that the DVD-ROM 10 is a Hyper-DVD, that is, a pay-per-view DVD, by detection of a code 4 rather than one of the three parental codes, via the header extension or binary code on the DVD-ROM, then the communications-portion 30 of the software of the invention will seek to retrieve the enabling data from a service provider by calling the service-provider over the PSTN. According to the invention, this enabling data may be obtained from the Internet, this enabling data may be obtained from the Internet, or, alternatively, via a cable company service provider for those users having cable TV service. In the case of obtaining the enabling data from a cable-TV company, the standard cable-box or set-tip box converter 32 is used for the communications. Also, for those users who utilize a cable box having Internet accessing device, the microprocessor 16 may be that microprocessor of the Internet accessing device itself, with the enabling data being transmitted from the Internet or from the cable TV provider. Instead of using a fourth parental code 4 for indicating the presence of a Hyper-DVD-ROM, a separate and distinct country code may be used, which country code, instead of representing an actual country, represents the a Hyper-DVD. The enabling data for allowing access to the DVD-ROM data may be any of those set forth in Applicants' above-mentioned copending patent applications, such as missing header, etc., and may also include conventional password, ID, security methods, or other standard verification keys, which are well-known and conventional.

After the user's software requests the downloading of the enabling data, the service provider will either send the data, of the requester is a valid customer and current on his account, or will reject the request. If the service provider transmits the necessary enabling data, then the software portion 30 of the invention sends the trigger-data 24 to the data switch 26 to connect the decryption chip 28 to the DVD-player 12.

While the invention is preferably suited for DVD-ROM disks, other large-storage disks, such as laser disks, video disks, etc., may embody the invention. Also, the invention may be used for those DVD-ROMs that do not employ parental and/or country codes; in this case, the code on the DVD-ROM for indicating that it is a Hyper-DVD requiring a verification key or password from a service-provider may be any of those set forth in Applicants' copending applications listed above, such as supplying the missing header, or any other data for uncrippling the crippled data on the DVD-ROM. Also, the use of a password or key, and the like, which would be provided by the service-provider if the requester passes a set of requirements, such as credit check, and the like, may be used.

The following is the software listing for encrypting the data on the DVD-ROM and cripples the data files thereon allowing playback only on a DVD player that recognizes the Hyper-DVD nature of the DVD-ROM.

```
//              Cutter c,
//         Function; this routine cuts a DVD file into multiple sections and
//              encrypts them onto a DVD rom.
//              critical section will be removed and stored on remote
//                 server. This also alerts DVD player to foreign file format
//                 and initiates search for permission keys.
//
//
//
#include <windows.h>
#include <stdlib.h>
#include <stdio.h>
#include <time.h>
include <string.h>
#include <sys\types.h>
#include <sys\stat.h>
#define MAX_HEADER_SIZE 64000
szBuffer_PGQUMAX_HAEDER-SIZE);
void flilJunk(char * statBuffer, Int n);
int FilecCutter(HWND hWnd char *fn)
{
    int V,T,L,nType;
    int n;
    int DEBUC = 0;
    FILE *pinputFile; *out;
    char filename[MAX_STR];
    char header[MAX_HEADER], *p, msg]MAX_STR]:
    char szNumber[MAX_STR];
    struct_stat statbuffer;
    int     nResult;
    long |RemainBytes;
    long |ReadBufferSize;
    long |Filesize;
    long |Index;
    long |ByteRead, |BytesWrite
    char szinFile[128], szOutFile(128], *pin, *pOut;
        char szOutfile_PCZ[] = "BIG. pgq";
    FILE *out2;
```

-continued

```
// get switch –S
strcpY(filename,fn)
_strupr(filename);
p=filename;
pin=szinFile;
pOut=szOutFile;
// first SPACE
while(*p= =!!)
    P + +;
    //copy IN file name
while(*p 1="&& *p!=0)
    {
    *pin ++ = *P ++
    }
//skip SPACE
while(*p = =")
    P + +;
while(*P | = "&& *p| =0
    {
    *pOut + += *p + +;
    }
*pin = '\0';
*pOut='\0';
//open files
If(strien(szinFiie) ==0)
{
    MessageBox(NULL, "Please drag&drop the file to me.\r\n in DOS, type\"encoder file\". ","Encoder v1.2"MB_OK);
    return 0;
}
/*Open file pinputFile Bin mode; *\
if( (pinputFile = fopen( szinFile, "rb")) = =NULL)
    {
    MessageBox(NULL, szinFile, "Error reading file", MB_OK;
    return 0;
    }
// NOW read nd cut the file into many parts:
// Critical part: filename.pgq --> stay on remote server
// Chunky part: filename.pgz --> On local media such as DVD-Rom
|BytesRead=fread   (szBuffer_PGQ,sizeof(char),MAX_HAEDER_SIZE,pinputFile);
if( (out2 = fopen(szOutFile_POZ,"w+b")) = = NULL)
    {
    MessageBox(NULL; szOutfile_PGZ, "Error creating PCQ file", MB_OK);
    return 0:
    }
|BytesWrite=fwrite (szBuffer_PGO; sizeof(char), |BytesRead,out2);
if(|BytesWrite ! = |BytesRead)
    MessageBox(NULL, "","|BytesWrite != |BytesRead", MB_OK);
fclose(out2);
// now the chunky part
//file type
nType = 0;
if( strstr( szinFile, ".AVI") = NULL)
    nType = 1;
else if( strstr( szinFile, ".EXE") != NULL)
    nType = 2;
else if( strstr( szinFile, ".MOV") = NULL)
    nType = 3;
else if( strstr( szinFile, ".MPG") != NULL)
    nType = 4;
else if( strstr( szinFile, ".JPG") != NULL)
    nType = 6;
else if( strstr( szinFile, ".GIF") != NULL)
    nType = 7;
else if( strstr( szinFile, "PIC") != NULL)
    nType = 8;
else if( strstr( szinFile, ".TXT") != NULL)
    nType = 9;
else if( strstr( szinFile, "HTM") != NULL)
    nType = 10;
else if( strstr( szinFile:, ".VOB") != NULL)
    nType = 111;
else
    {
    MessageBox(NULL, "Unrecognizer Error" , "Encoder error", MB_OK);
    return 0;
    }
T = nType;
If(strien(szOutFile) = = 0)
```

-continued

```
        {
        strcpy(szOutFile, szinFile);
        pOut = strstr(szOutFile,".");
        pOut + +
        strcpv(pOut; PGZ"),
        pOut + = 3;
        *pout = 0;
        wsprintf(msg,"Output file not specified.\nNew output file :[%s]", szoutFile);
        MessageBox(NULL,msg,"Warning|",MB_OK);
        }
    if( (out = fopen( szOutFile, "w + b")) = =NULL)
        {
        MessageBox(NULL; szOutFile, "Error creating file", MB_OK)
        return 0;
        }
    DEBUGGER(DEBUG, szOutFile, "File created|");
    //Add HyperLOCK HyperDVD header
    AddHyperDVDHeader();
    CutFileintoMultipleParts();
    WriteKeyFiles();
    WriteChunkyFiles();
    CloseHDVDFiles();
}
```

```
/*------------------------------------------------------
            File:     NpHcd cpp
            Functions: Just the MFC shell....
/*------------------------------------------------------*/
#include "stdafx.h"
#include "stcphcd.h"
#ifdef_DEBUC
#uncief THIS_FILE
static char BASED_CODE THIS_FILE() = _FILE_
#end,if
///////////////////////////////////////////////////
//CJunkApp
BEGIN_MESSAGE_MAP(CHcdPluginApp, CWinApp)
    //{{AFX_MSG_MAP(CJunkApp)
        //NOTE - the ClasssWizard will add and remove mapping macros here
        // DO NOT EDIT what you see in these blocks of generated code!
    //}}AFX_MSG_MAP
END_MESSAGE_MAP()
///////////////////////////////////////////////////
//CJunkApp construction
CHcdPlugInApp::CHcdPluginApp()
{
// TODO: add construction code here,
// Place all significant initialization in initinstance
}
///////////////////////////////////////////////////
// The one and only CHcdPluginApp object
CHcdPluginApp theApp;
```

The following is the software listing for a DVD player that discriminates between a Hyper-DVD of the invention and a standard DVD-ROM.

```
//
//      Player C
//
//      Function
//              This file shows a HVPerDVD player that
//              plays back HyperDvD files that have been
//              encrypted using HVPerLOCK patents pending
//              technologies.
//
//
//
#include <windows.h>
```

-continued

```
#include <mmsystem.h>
#include <digitalv.h>
#include "mmlo.h"
#include "resource.h"
#include <time.h>
#include <sys/types.h>
#include <sys/stat.h>
#include <stdio.h>
#include <string.h>
#define MAX_HEADER_SIZE 64000
    HINSTANCE ghinst:
    char szAppTitle[200] = "HyperDVD Player";
    int PASCAL WinMaTn(
    HINSTANCE hinst;
    HINSTANCE hPrevinstance,
    LPSTR IpCmdLine,
    int nCmdShow)
{
    MSO msg;
    (IpCmdLine);
    If(!hPrevinstance)
        If(!InitApplication(hinst))
    return FALSE;
    If(!Initinstance(hinst, ncmhdShow))
        return FALSE;
    while(GetMessage(&msg, NULL, 0, 0)) {
        TranslateMessage(&msg);
        DispatchMessaget&msg);
    }
    return msg wParam;
}
BOOL InitApplication(HINSTANCE hinst)
{
    WNDCLASS wc;
    wc.style      = NULL
    wc.IpfnWndProc = WndMainProc;
    wc.cbClsExtra = 0;
    wc.cbWndExtra = 0;
    wc,hinstance = hinst
    wc.hIcon        Load|con(hinst, NULL);
    wc.hCursor      LoadCursor(NULL, IDC_ARROW);
    wc.hbrBackground    = (HBRUSH)GetStockObject(WHITE_BRUSH);
    wc.IpszMenuName = "MAINMENU";
    wc.ipszClassName    = "HDVD";
    If(|Registerclass(&wc))
        return FALSE;
    return TRUE;
}
BOOL ininstance(HINSTANCE hinst, Int; nCmdShow)
{
    HWND hWnd;
    ghinst = hinst;
    hwnd = CreateWindow(
        "HDVD",
        szAppTitle,
        WS_OVERLAPPED | WS_CAPTION | WS_SYSMENU | WS_MINIMIZEBOX
        CW_USEDEFAULT, CW_USEDEFAULT, 300, 100,
        NULL, NULL, hinst, NULL);
    if(inWnd)
        return FALSE;
    ShoWWindow(hWnd, nCmdShow);
    UpdateWindow(hWnd);
    return TRUE;
}
BOOL FAR PASCAL About(HWND hDig, unsinged message, WORD wParam, LONG |Param)
{
    switch(message){
    case WM_INITRDIALOG:
        return TRUE;
    case WM_COMMAND;
        switch(wParam){
        case IDOK:
        case IDCANCEL:
    EnDialog(hDig, TRUE);
    return TRUE,
        }
        break
    }
    return FALSE;
```

-continued

```
}
LRESULT CALLBACK WndMainProc (HWND hwnd, UINT message, WPARAM, WParam, LPARAM (Param)
{
    switch(message){
    case WM_COMMAND:
        switch(wparam)
        {
          case ID_MMIO_INSTALL:
          {
            insertHyperDVD|OModule();
            break;
          }
          case ID_MMIO_REMOVE:
          {
            RemoveHyperDVDIOModule();
            break;
          }
          CASE ID_MCI_OPENHYPERDVD:
          {
            OPEN_HDVD();
            BREAK;
          }
          case ID_MCI_PLAY:
          {
            PLAY_HDVD();
            break;
          }
          case ID_MCI_CLOSE
          {
            CLOSE_HDVD()
            break;
          }
        }
        break;
    case WM_CLOSE
        DestroryWindow(hwnd):
        return 0;
    case WM_DESTROY:
        PostQuitMessage(0);
        return 0;
    }
    return DefWindowWProc(hwnd, message, wParam, (Param);
}
HDVDCALLBACK HDVDIO(LPMMIOINFO IpMMlOinfo, UNIT uMessage, LPARAM |PARAM1, LPARAMParam2)
{
    switch (uMessage) {
        case MM)OM_OPEN:
            HDVD_Open(),
            return 0;
        case MMIOM_CLOSE
            HDVD_Close()
            return 0;
        case MMlOIM_READ:
            HDVDReadMultipleFiles()
            return (|Param2)
        case MMIOM_SEEK
            switch(|Param2) {
                case SEEK_SET #seek to the absolute position relative to original beginning
                    HDVD_SeekSet();
                    break;
                case SEEK_CUR: // move forward relatlve to the current position
                    HDVD_SeekCur();
                case SEEK_END: // seek all the way to the end
                    HDVD SeekEnd();
                    break;
            }
        return HDVD_Offset()
        default;
            return -1;
    }
}
```

The following is the software listing for determining if a standard or Hyper DVD-ROM is to be played by the player, and for seeking the enabling data, trigger or key from a server or a cable-service provider for providing the missing data necessary for the DVD-player to play a Hyper-DVD.

```
/*----------------------------------------
//
//            HyperDVD
//
// The architecture of HyperDVD allows for
// authorized and secure rendering of encrypted multimedia object
// from the protected web site.  The encrypted HyperDVD media object is protected
// by crippling the media.  Only authorized user can obtain
// trigger/keys from the server to unlock the HyperDVD media.
//
----------------------------------------*/ ifndef _WIN32
define _WIN32
endif ifndef _NPAPI_H_
include "npapi.h"
#include "plgwnd.h"
#include "CHyperCD.h"
endif // mmio
include <mmsystem.h>
include <qtw.h> include <time.h>
include <string.h>
#include <io.h>
#include <fcntl.h>
#include <sys/stat.h>

//----------------------------------------
// NPP_Initialize:
//----------------------------------------
NPError NPP_Initialize(void)
{
    DEBUG_TEST("NPP_Initialize")
    return NPERR_NO_ERROR;
}

//----------------------------------------
// NPP_Shutdown:
//----------------------------------------
void NPP_Shutdown(void)
{
    DEBUG_TEST("NPP_Shutdown")
    return;
}
//----------------------------------------
// NPP_New:
//----------------------------------------

NPError NP_LOADDS
NPP_New(NPMIMEType pluginType,
        NPP instance,
        uint16 mode,
        int16 argc,
```

```
              char* argn[],
              char* argv[],
              NPSavedData* saved)
{
  DEBUG_TEST("NPP_New")

If (Instance == NULL)
      return NPERR_INVALID_INSTANCE_ERROR;

Instance->pdata = NPN_MemAlloc(sizeof(PluginInstance));
  PluginInstance* This = (PluginInstance*) instance->pdata;
  If (This != NULL)
  {
    This->window = NULL;
    This->cHypercd = new CHyperCD();

This->mode = mode;
    This->bAutoStart = FALSE;
    This->bLoop = FALSE;
    strcpy(This->InformationField,"HyperCD");

Int Idx;
    STRING sSYSFILE;

strcpy(sSYSFILE,SYSFILE);
    char *p1,*p2;
    STRING szArg, szValue,cd_title;

for ( idx =0; idx<argc; idx++) {
        strcpy(szArg,   argn[idx]);
        strcpy(szValue, argv[idx]);

// Check web tags and set HyperDVD flags
      SetHyperDVDFlags(szArg, szValue);
    }
    If(bDemandHyperDVD)
        goto parsing_embed_tags;

for ( idx =0; idx<argc; idx++) {
        strcpy(szArg,   argn[idx]);
        strcpy(szValue, argv[idx]);

ParseHyperDVDTags1(szArg,szValue);
    }

If(!bDemandHyperDVD)
        SysIO(sSYSFILE);

for (idx =0; idx<argc; idx++)
      {
        strcpy(szArg,   argn[idx]);
        strcpy(szValue, argv[idx]);

ParseHyperDVDTags2(szArg,szValue);
      }
parsing_embed_tags:
    Instance->pdata = This;
    return NPERR_NO_ERROR;
  }
  else
    return NPERR_OUT_OF_MEMORY_ERROR;
}
```

```
static void UnSubclass(PluginInstance *This)
{
    WNDPROC    OldWndProc;
    WNDPROC*   lplpfn = This->window->GetSuperWndProcAddr();
    DEBUG_TEST("UnSubclass")

if ( !*lplpfn )
    {
        ASSERT(0);
        return;
    }

// Set the original window procedure
    OldWndProc = (WNDPROC)::SetWindowLong( This->window->m_hWnd,
                        GWL_WNDPROC, (LONG) *lplpfn );

// A subclassed window's procedure is always AfxWndProc.
    // If this is not TRUE, then it's not a subclassed window.
    if ( OldWndProc != AfxWndProc )
        ASSERT(0);
} static void KillHyperCDWindow(PluginInstance *This)
{

DEBUG_TEST("KillHyperCDWindow")

if (This->cHypercd) {
        This->cHypercd->Close();
        delete This->cHypercd;
        This->cHypercd = NULL;
    }

CleanUpHyperDVD();
    UnSubclass(This);

if (This->window) {
        This->window->Detach();
        delete This->window;
        This->window = NULL;
    }
}

//--------------------------------------------------------
// NPP_Destroy:
//--------------------------------------------------------
NPError NP_LOADDS
NPP_Destroy(NPP instance, NPSavedData** save)
{
    if (instance == NULL)
        return NPERR_INVALID_INSTANCE_ERROR;

PluginInstance* This = (PluginInstance*) instance->pdata;

//
    // Note: If desired, call NP_MemAlloc to create a
    // NPSavedData structure containing any state information
    // that you want restored if this plugin instance is later
    // recreated.
```

```
// if (This != NULL)
{
   KillHyperCDWindow(This);
   NPN_MemFree(Instance->pdata);
} return NPERR_NO_ERROR;
}

//----------------------------------------------------------
// NPP_SetWindow:
//----------------------------------------------------------
NPError NP_LOADDS
NPP_SetWindow(NPP Instance, NPWindow* np_window)
{

DEBUG_TEST("NPP_SetWindow")

if (Instance == NULL)
      return NPERR_INVALID_INSTANCE_ERROR;

PluginInstance* This = (PluginInstance*) Instance->pdata;

//
   // Note: Before setting fWindow to point to the
   // new window, you may wish to compare the new window
   // info to the previous window (if any) to note window
   // size changes, etc.
   //

If (!np_window)
      return NPERR_GENERIC_ERROR;

If (!instance)
      return  NPERR_INVALID_INSTANCE_ERROR;

if (!This)
      return NPERR_GENERIC_ERROR;

If (!np_window->window && !This->window) // spurious entry
      return NPERR_NO_ERROR;

If (!np_window->window && This->window)
   {  // window went away
      KillHyperCDWindow(This);
      return NPERR_NO_ERROR;
   }
   If (!This->window && np_window->window)
   {  // First time in -- no window created by plugin yet
      This->window = (CPluginWindow *) new CPluginWindow();
      If (!This->window->SubclassWindow((HWND)np_window->window))
      {
         MessageBox(NULL,"SubclassWindow Failed","HyperCD",MB_OK);
         return NPERR_GENERIC_ERROR;
      }
      // Save This pointer in window class member variable..this lets the
      // window message handling have access to the data pointer easily
      This->window->StoreData(This);
   }
```

```
// resize or moved window (or newly created)
This->window->InvalidateRect(NULL);
This->window->UpdateWindow();
return NPERR_NO_ERROR;
}

//------------------------------------------------------------
// NPP_NewStream:
//------------------------------------------------------------
NPError NP_LOADDS
NPP_NewStream(NPP instance,
              NPMIMEType type,
              NPStream *stream,
              NPBool seekable,
              uint16 *stype)
{
   DEBUG_TEST("NPP_NewStream")

if (instance == NULL)
      return NPERR_INVALID_INSTANCE_ERROR;
   PluginInstance* This = (PluginInstance*) instance->pdata;

*stype = NP_ASFILE;

return NPERR_NO_ERROR;
}

Int32 STREAMBUFSIZE = 0X0FFFFFFF;  // If we are reading from a file in NPAsFile
                                   // mode so we can take any size stream in our
                                   // write call (since we ignore it)
//------------------------------------------------------------
// NPP_WriteReady:
//------------------------------------------------------------
Int32 NP_LOADDS
NPP_WriteReady(NPP instance, NPStream *stream)
{
   DEBUG_TEST("NPP_WriteReady")

if (instance != NULL)
   {
      PluginInstance* This = (PluginInstance*) instance->pdata;
   }
   return STREAMBUFSIZE;  // Number of bytes ready to accept in NPP_Write()
}

//------------------------------------------------------------
// NPP_Write:
//------------------------------------------------------------
Int32 NP_LOADDS
NPP_Write(NPP instance, NPStream *stream, int32 offset, int32 len, void *buffer)
{
   DEBUG_TEST("NPP_Write")
```

```
// resize or moved window (or newly created)
This->window->InvalidateRect(NULL);
This->window->UpdateWindow();
return NPERR_NO_ERROR;
}

//--------------------------------------------------
// NPP_NewStream:
//--------------------------------------------------
NPError NP_LOADDS
NPP_NewStream(NPP instance,
              NPMIMEType type,
              NPStream *stream,
              NPBool seekable,
              uint16 *stype)
{
    DEBUG_TEST("NPP_NewStream")

if (instance == NULL)
        return NPERR_INVALID_INSTANCE_ERROR;
    PluginInstance* This = (PluginInstance*) instance->pdata;

*stype = NP_ASFILE;

return NPERR_NO_ERROR;
} int32 STREAMBUFSIZE = 0X0FFFFFFF;  // If we are reading from a file in NPAsFile
                                    // mode so we can take any size stream in our
                                    // write call (since we ignore it)

//--------------------------------------------------
// NPP_WriteReady:
//--------------------------------------------------
int32 NP_LOADDS
NPP_WriteReady(NPP instance, NPStream *stream)
{
    DEBUG_TEST("NPP_WriteReady")

if (instance != NULL)
    {
        PluginInstance* This = (PluginInstance*) instance->pdata;
    }
    return STREAMBUFSIZE;  // Number of bytes ready to accept in NPP_Write()
}

//--------------------------------------------------
// NPP_Write:
//--------------------------------------------------
int32 NP_LOADDS
NPP_Write(NPP instance, NPStream *stream, int32 offset, int32 len, void *buffer)
{
    DEBUG_TEST("NPP_Write")
```

```
    .instance I = NULL)

PluginInstance* This = (PluginInstance*) instance->pdata;

} return len;      // The number of bytes accepted
}
//------------------------------------------------------------
// NPP_DestroyStream:
//------------------------------------------------------------
NPError NP_LOADDS
NPP_DestroyStream(NPP instance, NPStream *stream, NPError reason)
{

DEBUG_TEST("NPP_DestroyStream")

if (instance == NULL)
     return NPERR_INVALID_INSTANCE_ERROR;
  PluginInstance* This = (PluginInstance*) instance->pdata;

return NPERR_NO_ERROR;
}

//------------------------------------------------------------
// NPP_StreamAsFile:
//------------------------------------------------------------
void NP_LOADDS
NPP_StreamAsFile(NPP instance, NPStream *stream, const char* szStream)
{
  int   nTriggerIndex, nType;
  char  szFile[MAX_STR],szMessage[MAX_STR];
  char  szMsg[200];
  char  *pTemp, szPath[MAX_STR];

DEBUG_TEST("NPP_StreamAsFile")
  if (instance == NULL)
     return;
  PluginInstance* This = (PluginInstance*) instance->pdata;
  If (!This->cHypercd)
     return;

// Obtain object/keys
  ObtainKey(Object, szStream);
  If(bDemandHyperDVD)
     {
     If(ObjectType(Object) == PGI_HYPERKEY) // file in bDemandHyperDVD {// 1. check we have permission
        Permission = PermissionFromWebtoUseHyperDVD0;

// if our right is lower than the permitted, return
        If(Permission.right > User.right)
            return;

// 2. if we have permission, get the access path
        strcpy(szPath, GetAccessPath(Permission));

// 3. retrieve the object  and wait
```

```
        RetrieveHyperDVDObject(sz, n);
        return;
        }

// B. check if the streamed file is PCI_MEDIA
    else If( ObjectType(Object) == PCI_MEDIA) // Jpeg, avi, encrypted media type
        {
        DisplayObject(Object );
        }
    else // anything else under bDemandHyperDVD, is not valid
        return;

}
else// for this version, return and not process other command
    return;

//--------------------------------------------------
// NPP_Print:
//--------------------------------------------------
void NP_LOADDS
NPP_Print(NPP instance, NPPrint* printinfo)
{
    DEBUG_TEST("NPP_Print")

if(printinfo == NULL)   // trap invalid parm
        return;

if (instance != NULL)
    {
        PluginInstance* This = (PluginInstance*) instance->pdata;

if (printinfo->mode == NP_FULL)
        {
            //
            // Note: If your plugin would like to take over
            // printing completely when it is in full-screen mode,
            // set printinfo->pluginPrinted to TRUE and print your
            // plugin as you see fit. If your plugin wants Netscape
            // to handle printing in this case, set printinfo->pluginPrinted
            // to FALSE (the default) and do nothing. If you do want
            // to handle printing yourself, printOne is true if the
            // print button (as opposed to the print menu) was clicked.
            // On the Macintosh, platformPrint is a THPrint; on Windows,
            // platformPrint is a structure (defined in npapi.h) containing
            // the printer name, port, etc.
            //
            void* platformPrint = printinfo->print.fullPrint.platformPrint;
            NPBool printOne = printinfo->print.fullPrint.printOne;

printinfo->print.fullPrint.pluginPrinted = FALSE; // Do the default
        }
        else   // if not fullscreen, we must be embedded
        {
            //
            // Note: If your plugin is embedded, or is full-screen
            // but you returned false in pluginPrinted above, NPP_Print
            // will be called with mode == NP_EMBED. The NPWindow
            // in the printinfo gives the location and dimensions of
            // the embedded plugin on the printed page. On the Macintosh,
            // platformPrint is the printer port; on Windows, platformPrint
```

```
        // is the handle to the printing device context.
        //
        NPWindow* printWindow = &(printInfo->print.embedPrint.window);
        void* platformPrint = printInfo->print.embedPrint.platformPrint;
    }
  }
}

//----------------------------------------------------
// NPP_HandleEvent:
// Mac-only.
//----------------------------------------------------
int16 NPP_HandleEvent(NPP instance, void* event)
{
    NPBool eventHandled = FALSE;
    if (instance == NULL)
        return eventHandled;

PluginInstance* This = (PluginInstance*) instance->pdata;

//
    // Note: The "event" passed in is a Macintosh
    // EventRecord*. The event.what field can be any of the
    // normal Mac event types, or one of the following additional
    // types defined in npapi.h: getFocusEvent, loseFocusEvent,
    // adjustCursorEvent. The focus events inform your plugin
    // that it will become, or is no longer, the recipient of
    // key events. If your plugin doesn't want to receive key
    // events, return false when passed at getFocusEvent. The
    // adjustCursorEvent is passed repeatedly when the mouse is
    // over your plugin; if your plugin doesn't want to set the
    // cursor, return false. Handle the standard Mac events as
    // normal: The return value for all standard events is currently
    // ignored except for the key event: for key events, only return
    // true if your plugin has handled that particular key event.
    // return eventHandled;
}
```

```
/************************       ***************************\
 *                          *
 * Copyright © 1997 HyperLOCK Technologies, Inc.
 *                          *
 * Module Name:             *
 *                          *
 *   PGI_QT_Player.cpp      *
 *                          *
 * Abstract:                *
 *                          *
 *                          *
 *                          *
 * Author:                  *
 *                          *
 * Vision:1.0               *
 *                          *
 * Revision History:        *
 *                          *
\************************************************************/

//#include "stdafx.h"

int   GAPCONTROLER;
long  OldWinProc, PGI_Key, PGI_Version;
QTEMBEDINFO QT_EmbedInfo;

int PGI_QT_Player(PGI_QTDatastruct  QTDatastruct)
{
    if (!(thk_ThunkConnect32("PGI_QT.DLL",
            "NPHCD32.DLL",
                NULL,//hInstance,
                DLL_PROCESS_ATTACH)))
    {
    MessageBox (NULL, "Component failure", "Error", MB_OK);
      return FALSE;
    }

//MSG    msg;

QT_EmbedInfo.AutoPlay    = 1;
    QT_EmbedInfo.Loop        = 1;
    QT_EmbedInfo.Info1       = 0;
    QT_EmbedInfo.Info2       = 0;

PGI_Key = QTDatastruct.nMediaType;
    GAPCONTROLER = QTDatastruct.m_GapControler;

OldWinProc = GetWindowLong(
            QTDatastruct.hWnd, // handle of window
            GWL_WNDPROC       // offset of value to retrieve
            );

// Set QTWndProc to QT Window
    //SetWindowLong(QTDatastruct.hWnd,GWL_WNDPROC,(LONG)JPEGWndProc);

if(PGI_Key)   // PGI_Key = 0--> QuickTime movie; PGI_Key = 1--> JPEG picture;
    {
        SetWindowLong(QTDatastruct.hWnd,GWL_WNDPROC,(long)JPEGWndProc);
```

```
    }
    else
    {
        SetWindowLong(QTDatastruct.hWnd,GWL_WNDPROC,(long)QTWndProc);
    }

If (!DisplayMedia(QTDatastruct.lpFileName, QTDatastruct.hWnd))
    {
        if(PGI_Key)    // PGI_Key = 0--> QuickTime movie; PGI_Key = 1--> JPEG picture;
        {
            MessageBox (NULL, "JPEG picture failure", "Error", MB_OK);
            return FALSE;
        }
        else
        {
            MessageBox (NULL, "Quick Time failure", "Error", MB_OK);
            return FALSE;
        }

}
    return TRUE;
}

//QuickTime Window
long FAR PASCAL QTWndProc (HWND hWnd, UINT message, WPARAM wParam,
                LPARAM lParam)
{
    PAINTSTRUCT ps;

// Call QuickTime's MCIsPlayerMessage(...) function by "thunk"
    if(PGI_QT_MCSL(message, wParam, lParam, hWnd, PGI_Key))
    return 0;

//Process the windows message
    switch (message)
    {
      case WM_PAINT:

PGI_QT_UpdateControlerSL(GetParent(hWnd));
        PGI_QT_UpdateControlerSL(hWnd);

If (!BeginPaint (hWnd, &ps))
           return 0;

EndPaint (hWnd, &ps);

return 0;

case WM_DESTROY:
        #ifdef _DEBUG
        MessageBox (NULL,"TerminateMovie32", "TerminateMovie32", MB_OK);
        #endif PGI_QT_ExitSL 0;
        SetWindowLong(hWnd,GWL_WNDPROC,OldWinProc);
        PostQuitMessage (0);
```

29

```
      return 0;
   }

//Return to Windows
   return DefWindowProc (hWnd, message, wParam, lParam);
} long FAR PASCAL JPEGWndProc (HWND hWnd, UINT message, WPARAM wParam,
            LPARAM lParam)
{
  switch (message)
  {
   /*
   case WM_RBUTTONDOWN:

//fwKeys = wParam;    // key flags
      int xPos = LOWORD(lParam); // horizontal position of cursor
      int yPos = HIWORD(lParam); // vertical position of cursor CMenu cmPopup;
      if(cmPopup.CreatePopupMenu() == 0) {
         return;
      }
   //if(pAvi->mDisableRButtonDown)
      {
         uState = MF_ENABLED;
      }
   ClientToScreen(&cpPoint);
   cmPopup.TrackPopupMenu(TPM_LEFTALIGN | TPM_RIGHTBUTTON, xPos, yPos, this, NULL);

return 0;
   */
   case WM_PAINT:

PGI_QT_MCSL(message, wParam, lParam, hWnd, PGI_Key);

return 0;

case WM_DESTROY:

#ifdef _DEBUG
      MessageBeep (MB_ICONASTERISK);
      #endif

PGI_QT_ExitSL ();
      SetWindowLong(hWnd,GWL_WNDPROC,OldWinProc);
      PostQuitMessage (0);

return 0;
   }

//Return to Windows
   return DefWindowProc (hWnd, message, wParam, lParam);
}

// Call 16 bit QT functions
int DisplayMedia(LPSTR MovieName,HANDLE QT_hInstance)
{
   //PGI_Key = 0;
   //PGI_Version = 0;
   return(PGI_QT_CreateSL( PGI_Key,      PGI_Version,
```

```
MovieName,    QT_instance,
GAPCONTROLER,  QT_EmbedInfo));
```

While specific embodiments of the invention have been shown and described, it is to be understood that numerous changes and modifications may be made therein without departing from the scope, spirit and intent of the invention as set forth in the appended claims.

What we claim is:

1. In a large storage-capacity ROM-disk for storing large amounts of data, said data being less than the complete data required for play back such as video and audio, for playback by a player, said ROM-disk having at least one of a parental code means and a country code means thereon, the improvement comprising:

additional code means thereon for preventing playback of said ROM-disk without enabling data which completes said data required for playback, said enabling data being provided remotely.

2. The large storage-capacity ROM-disk for storing large amounts of data according to claim 1, wherein said parental code means comprises one of a first code representing children-only titles that may be played by said player, a second code representing that only adult titles are prevented from being played by said player, and a third code representing that all titles may be played by said player, wherein said additional code means for preventing playback of said ROM-disk without enabling data comprises a fourth code of said parental code different from said first, second and third codes.

3. The large storage-capacity ROM-disk for storing large amounts of data according to claim 1, wherein said country code means comprises one of a plurality of codes representing a specific country in which said ROM-disk is to be played, said player having a corresponding code matching said one country code allowing playback of said ROM-disk, wherein said additional code means for preventing playback of said ROM-disk without enabling data comprises another unique country code, said another unique country code being one that does not represent an actual country.

4. The large storage-capacity ROM-disk for storing large amounts of data according to claim 1, wherein said ROM-disk is a DVD-ROM disk.

5. The large storage-capacity ROM-disk for storing large amounts of data according to claim 1, in combination with player means for playing back the data on said ROM-disk, said player means comprising differentiating means for differentiating between a ROM-disk having said additional code thereon, and a ROM-disk not having said additional code thereon, whereby when said differentiating means of said player means detects a ROM-disk without said another code thereon, said player means automatically plays back the data thereon, and whereby if said differentiating means of said player means detects a ROM-disk with said another code thereon, said player means automatically generates a call to a service provider seeking to obtain said enabling data in order to allow play-back of said ROM-disk.

6. The large storage-capacity ROM-disk for storing large amounts of data according to claim 5, wherein said player means comprises enabling-data seeking means for calling a service provider for requesting the downloading of said enabling data; said player means further comprising a disk-player, trigger means, and switch means, said trigger means generating a trigger signal in response to the reception of said enabling data from the service provider for actuating said switch means for actuating said disk-player to play the ROM-disk.

7. The large storage-capacity ROM-disk for storing large amounts of data according to claim 6, wherein said ROM-disk comprises encrypted data, said player means further comprising decrypting means for decrypting said data for playback; said trigger means triggering said switch means to couple said decrypting means to said disk-player for decrypting said data in order to allow playback by said disk-player.

8. The large storage-capacity ROM-disk for storing large amounts of data according to claim 6, wherein said player means comprises a microprocessor, and each of said enabling-data seeking means, trigger means, and switch means comprises software code operatively associated with said microprocessor.

9. The large storage-capacity ROM-disk for storing large amounts of data according to claim 5, wherein said player means comprises enabling-data seeking means for calling a service provider for requesting the downloading of said enabling data; and coupling means coupling said player means to a service provider, said coupling means comprising at least one of a modem for connecting said player means to said service provider, and a cable box for connecting said player means to a cable-TV service provider.

10. The large storage-capacity ROM-disk for storing large amounts of data according to claim 8, wherein said ROM-disk is a DVD-ROM disk.

11. A ROM-disk playing apparatus for discriminating between a large storage-capacity ROM-disk having playback-prevent code means thereon and a ROM-disk not having playback-prevent code means thereon, comprising:

a disk-player for playing back a ROM-disk;

a microprocessor;

memory means for storing software;

software means comprising first means for detecting the presence of a ROM-disk having playback-prevent code means thereon; second means for generating a call to a service provider in response to said first means detecting the presence of said code means, in order to retrieve enabling data for allowing playback of data on a ROM-disk; and third means for generating a trigger to allow said disk-player to playback said data on a ROM-disk.

12. The ROM-disk playing apparatus according to claim 11, wherein said memory means further comprises fourth means for decrypting encrypted data on a ROM-disk; said third means coupling said fourth means for decrypting to said disk-player.

13. The ROM-disk playing apparatus according to claim 12, wherein said disk-player comprises a MPEG-2 video player.

14. The ROM-disk playing apparatus according to claim 11, further comprising coupling means for coupling said second means for generating a call to a service provider, said coupling means comprising at least one of a modem and a cable box.

15. The ROM-disk playing apparatus according to claim 11, in combination with a DVD-ROM disk, said DVD-ROM disk having at least one of a parental code means and a country code means thereon, and playback-prevent code means thereon for preventing playback of said ROM-disk without enabling data.

16. The ROM-disk playing apparatus according to claim 15, wherein said parental code means comprises one of a first code representing children-only titles that may be played by said disk-player, a second code representing that only adult titles are prevented from being played by said disk-player, and a third code representing that all titles may be played by said disk-player, wherein said additional code means for preventing playback of said ROM-disk without enabling data comprises a fourth code of said parental code different from said first, second and third codes.

17. The ROM-disk playing apparatus according to claim 15, wherein said country code means comprises one of a plurality of codes representing a specific country in which said ROM-disk is to be played, said disk-player having a corresponding code matching said one country code allowing playback of said ROM-disk, wherein said additional code means for preventing playback of said ROM-disk without enabling data comprises another unique country code, said another unique country code being one that does not represent an actual country.

18. A method of labeling a DVD-ROM comprising:

(a) encoding the DVD-ROM with data being less than the complete data required for playback and with a code that prevents playback of the data on the DVD-ROM without first obtaining enabling data which completes said data Required for playback, said enabling data being provided remotely;

(b) said step (a) comprising encoding the DVD-ROM with at least one of a new parental code different from those used for parental control of playback of DVD-titles, and a new country code that does not actually represent a country.

19. A method of playing back a large storage-capacity ROM-disk, comprising:

(a) reading a ROM-disk via a player apparatus, and differentiating between a ROM-disk encoded to prevent playback thereof without enabling data, and a ROM-disk not encoded to prevent playback without enabling data;

(b) playing the ROM-disk if it is not encoded to prevent playback without enabling data;

(c) generating an enabling-data request to a service-provider if the ROM-disk is encoded to prevent playback without enabling data;

(d) sending the enabling-data request to a service-provider for requesting the return-sending of enabling data that will enable the playback of the ROM-disk with code to prevent playback;

(e) receiving the enabling data from the service provider; and (f) enabling the playback of the ROM-disk with code to prevent playback by the player apparatus in response to said step (e).

20. The method of playing back a large storage-capacity ROM-disk according to claim 19, wherein before said step (a):

(g) encoding a ROM-disk to prevent playback without having first obtained enabling data therefor.

21. The method of playing back a large storage-capacity ROM-disk according to claim 19, wherein said step (d) comprises communicating with a service provider by at least one of the Internet and a cable-box.

22. The method of playing back a large storage-capacity ROM-disk according to claim 19, wherein said step (f) comprises connecting a decryption means to the player apparatus for decrypting the encrypted data on the ROM-disk.

23. The method of playing back a large storage-capacity ROM-disk according to claim 19, wherein said step (a) comprises reading a DVD disk.

* * * * *